(12) United States Patent
Baird et al.

(10) Patent No.: US 7,297,658 B2
(45) Date of Patent: Nov. 20, 2007

(54) DIRECT THERMOGRAPHIC MATERIALS WITH CROSSLINKED CARRIER LAYER

(75) Inventors: David G. Baird, Woodbury, MN (US); Raymond J. Kenney, Woodbury, MN (US); Scott C. Moose, Victor, NY (US)

(73) Assignee: Carestream Health, Inc., Rochester, NY (US)

( * ) Notice: Subject to any disclaimer, the term of this patent is extended or adjusted under 35 U.S.C. 154(b) by 343 days.

(21) Appl. No.: 11/166,291

(22) Filed: Jun. 24, 2005

(65) Prior Publication Data

US 2006/0293182 A1    Dec. 28, 2006

(51) Int. Cl.
*B41M 5/30*    (2006.01)
(52) U.S. Cl. ............... 503/201; 427/152; 503/212; 503/226
(58) Field of Classification Search ............... None
See application file for complete search history.

(56) References Cited

U.S. PATENT DOCUMENTS

| | | |
|---|---|---|
| 5,275,932 A | 1/1994 | Weigel et al. |
| 5,468,603 A | 11/1995 | Kub |
| 5,578,548 A | 11/1996 | Bjork et al. |
| 5,686,228 A | 11/1997 | Murray et al. |
| 6,313,065 B1 | 11/2001 | Horsten et al. |
| 6,436,622 B1 | 8/2002 | Geisler |
| 2004/0043338 A1 | 3/2004 | Yanagisawa |

FOREIGN PATENT DOCUMENTS

| | | |
|---|---|---|
| EP | 0 600 586 A1 | 6/1994 |
| EP | 1 006 405 A1 | 6/2000 |
| JP | 06001960 | 1/1994 |
| JP | 06240213 | 8/1994 |
| JP | 09113724 | 5/1997 |
| JP | 10158614 | 6/1998 |

*Primary Examiner*—Bruce H. Hess

(57) ABSTRACT

A direct thermographic material has one or more thermographic layers comprising a film-forming polymer binder on a polymeric support. Disposed between the polymeric support and the one or more thermographic layers is a non-light sensitive adhesive layer comprising one or more polyisocyanate crosslinked hydrophobic polymer binders.

20 Claims, No Drawings

DIRECT THERMOGRAPHIC MATERIALS WITH CROSSLINKED CARRIER LAYER

FIELD OF THE INVENTION

This invention relates to non-photosensitive thermographic materials, particularly black-and-white direct thermographic materials, having a unique adhesive layer ("carrier" layer) between the imaging layers and a polymeric support. The invention also relates to methods of imaging such direct thermographic materials.

BACKGROUND OF THE INVENTION

Silver-containing direct thermographic imaging materials are non-photosensitive materials that are used in a recording process wherein images are generated by the direct application of thermal energy and in the absence of a processing solvent. These materials have been known in the art for many years and generally comprise a support having disposed thereon one or more imaging layers comprising (a) a relatively or completely non-photosensitive source of reducible silver ions, (b) a reducing agent composition (acting as a black-and-white silver developer) for the reducible silver ions, and (c) a suitable binder. Thermographic materials are sometimes called "direct thermal" materials in the art because they are directly imaged by a source of thermal energy without any transfer of the image or image-forming materials to another element (such as in thermal dye transfer).

In a typical thermographic construction, the image-forming thermographic layers comprise silver salts of long chain fatty acids. The preferred non-photosensitive reducible silver source is a silver salt of a long chain aliphatic carboxylic acid having from 10 to 30 carbon atoms, such as behenic acid or mixtures of acids of similar molecular weight. At elevated temperatures, the silver(I) of the silver carboxylate is reduced by a reducing agent (also known as a developer), whereby elemental silver is formed. Imagewise heating, such as by using a thermal print-head, results in a black-and-white image.

Problem to be Solved

As noted above, direct thermographic materials are imaged by a recording process whereby images are generated by imagewise heating a recording material containing chemical components that change color or optical density in an imagewise fashion. Such materials generally include one or more thermographic (imaging) layers on a polymeric support. Adhesion between those layers and the support is a concern because of the high temperatures to which the material is exposed during imaging and transport through an imaging device. There is a risk that pieces of the imaged material can flake off during this process causing debris and damage to both the imaged material and imaging equipment. In addition, there is a concern that various chemicals can migrate out of the material into the imaging device.

U.S. Pat. No. 6,436,622 (Geisler) describes direct thermographic materials that include an adhesion-promoting or carrier layer between the imaging layers and the polymeric support. Polyisocyanates are described for use as hardeners for binders in the thermographic layers. Polyisocyanates have also been described in U.S. Pat. No. 6,313,065 (Horsten et al.), U.S. Pat. No. 5,275,932 (Weigel et al.), and U.S. Pat. No. 5,578,548 (Bjork et al.) as hardeners for topcoat layers of thermographic materials.

There remains a need, however, for improved adhesion between the imaging layers and the polymeric support in thermographic materials.

SUMMARY OF THE INVENTION

This invention provides a direct thermographic material comprising a polymeric support and having thereon one or more thermographic layers comprising a film-forming polymer binder, and disposed between the polymeric support and the one or more thermographic layers, a non-light sensitive adhesive layer comprising a polyisocyanate-crosslinked hydrophobic polymer binder that is the reaction product of a polyisocyanate crosslinking agent with reactive sites of one or more hydrophobic polymer binders, and wherein the polyisocyanate crosslinking agent is a compound represented by the following Structure I:

$$O=C=N-L-(N=C=O)_m \qquad (I)$$

wherein L is a linking group comprising an alkylene group having at least 6 carbon atoms, a cycloalkylene group, or an arylene group, and m is an integer of at least 1.

In preferred embodiments, a black-and-white direct thermographic material comprises an uncoated and untreated polyester support and having on only one side thereof:

a thermographic layer comprising a non-photosensitive source of reducible silver ions that includes at least highly crystalline silver behenate and a reducing agent for producing a silver image, all distributed in a film-forming polyvinyl acetal or cellulosic polymer binder, an outermost layer disposed over the thermographic layer, the outermost layer comprising matte particles and a lubricant mixture distributed in a cellulosic polymer binder, disposed between the polyester support and the thermographic layer, a non-light sensitive adhesive layer comprising a polyisocyanate-crosslinked hydrophobic polymer binder that is the reaction product of a polyisocyanate crosslinking agent with reactive sites of at least one of two or more hydrophobic polymer binders, that include a first polymer serving to promote adhesion of the adhesive layer to the polymeric support, and a second polymer, wherein the first and second polymers are different polymers, wherein the first polymer is a polyvinyl acetal, cellulosic polymer, polyester, polycarbonate, epoxy resin, rosin polymer, polyketone resin, vinyl polymer, or maleic anhydride ester copolymer, and the second polymer is a polyvinyl acetal, cellulosic polymer, vinyl polymer, or maleic anhydride-ester copolymer, and the polyisocyanate crosslinking agent comprises one or more of the following aromatic polyisocyanates in an amount of from about 10 to about 30% based on the total dry weight of the single-phase mixture:

toluene (2,4 or 2,6)-diisocyanate and derivatives thereof, naphthalene 1,5-diisocyanate, 4,4'-diisocyanatodiphenylmethane, p-phenylene diisocyanate, triphenylmethane triisocyanate, tris-(4-isocyanatophenyl)thiophosphate, 3,3'-dimethyl-4,4'-biphenyl diisocyanate, and 3,3'-dimethoxy-4,4'-biphenyl diisocyanate.

This invention also provides a method comprising imaging the direct thermographic material of the invention with a thermal imaging source to provide a visible image. The resulting image can be used for medical diagnosis, among other uses.

We have found an improvement in thermographic materials by incorporating a crosslinked "carrier" layer between the thermographic layers and polymeric support. Besides the improved adhesion, we unexpectedly found an increase in silver efficiency.

DETAILED DESCRIPTION OF THE INVENTION

The direct thermographic materials can be used to provide black-and-white silver images using non-photosensitive silver salts, reducing agents, binders, and other components known to be useful in such materials.

The direct thermographic materials can be used in black-and-white thermography and in electronically generated black-and-white hardcopy recording. They can be used as output media, in radiographic imaging (for example digital medical imaging), X-ray radiography, and in industrial radiography. Furthermore, the absorbance of these thermographic materials between 350 and 450 nm is desirably low (less than 0.5), to permit their use in the graphic arts area (for example, in imagesetting and phototypesetting operations), in the manufacture of printing plates, in contact printing, in duplicating ("duping"), and in proofing.

The direct thermographic materials are particularly useful as output media for medical imaging of human or animal subjects in response to visible or X-radiation for diagnostic purposes. Such applications include, but are not limited to, thoracic imaging, mammography, dental imaging, orthopedic imaging, general medical radiography, therapeutic radiography, veterinary radiography, and auto-radiography.

In direct thermographic materials, the components needed for imaging can be in one or more thermographic layers on one side ("frontside") of the support. The layer(s) that contain the non-photosensitive source of reducible silver ions, or both, are referred to herein as thermographic, emulsion, or thermally sensitive imaging layer(s).

Where the materials contain thermographic imaging layers on one side of the support only, various non-light sensitive, non-imaging layers can be disposed on the "backside" (non-emulsion or non-imaging side) of the materials, such as, primer layers, interlayers, opacifying layers, subbing layers, carrier layers, auxiliary layers and/or conductive layers. Particularly important non-imaging layers include a backside conductive layer containing an antistatic agent and an outermost backside protective layer.

In such embodiments, various non-imaging layers can also be disposed on the "frontside," imaging, or emulsion side of the support, including primer layers, interlayers, opacifying layers, subbing layers, auxiliary layers carrier layers, and other layers readily apparent to one skilled in the art.

In some embodiments, the direct thermographic materials are "double-sided" and have thermographic imaging layer(s) on both sides of the support. In such constructions, each side can also include one or more carrier layers, primer layers, adhesive layers, interlayers, antistatic or conductive layers, auxiliary layers, and other layers readily apparent to one skilled in the art. An outermost protective layer can be on either or both sides of the support.

Definitions

As used herein:

In the descriptions of the thermographic materials, "a" or "an" component refers to "at least one" of that component (for example, the polyisocyanate crosslinking agents described below).

The term "black-and-white" refers to an image formed by silver metal.

"Thermographic material(s)" means a dry processable integral element comprising a support having at least one thermographic emulsion layer or a set of thermographic emulsion layers, (wherein the source of reducible silver ions is in one layer and other components or additives are distributed, as desired, in the same layer or in one or more additional coated layer), that provides a black-and-white silver image. Such additional layers include protective layers, carrier layers, conductive layers, and subbing or priming layers. These materials preferably have at least one outermost protective layer on the imaging side that is in direct contact with the imaging means during thermal imaging. These materials also include multilayer constructions in which one or more imaging components are in different thermographic layers, but are in "reactive association." For example, one layer can include the non-photosensitive source of reducible silver ions and another layer can include the reducing agent, but the two reactive components are in reactive association with each other. Preferably these materials have at least one outermost protective layer as described herein located above all thermographic layers. By "integral," we mean that all imaging chemistry required for imaging is in the material without diffusion of imaging chemistry or reaction products (such as a dye) from or to another element (such as a receiver element).

Also, unless otherwise indicated, the terms "thermographic material" and "direct thermographic material" are meant to refer to embodiments of the present invention.

When used in thermography, the term, "imagewise exposing" or "imagewise exposure" means that the material is imaged using any means that provides an image using heat. This includes, for example, analog exposure where an image is formed by differential contact heating through a mask using a thermal blanket or infrared heat source, as well as by digital exposure where the image is formed one pixel at a time such as by modulation of a thermal print-head or by thermally imaging with a modulated scanning laser beam.

The materials of this invention are "direct" thermographic materials that are imaged using a digital exposure and thermal imaging is carried out in a single thermographic material containing all the necessary imaging chemistry. Direct thermal imaging is distinguishable from what is known in the art as thermal transfer imaging (such as dye transfer imaging) in which the image is produced in one material ("donor") and transferred to another material ("receiver") using thermal means.

"Catalytic proximity" or "reactive association" means that the reactive components are in the same layer or in adjacent layers so that they readily come into contact with each other during thermal imaging and development.

"Emulsion layer," "imaging layer," "thermographic layer," or "thermographic emulsion layer," means a thermally sensitive layer of a thermographic material that contains at least the non-photosensitive source of reducible silver ions. It can also mean a layer of the thermographic material that contains, in addition to the non-photosensitive source of reducible silver, additional desirable components. These layers are usually on what is known as the "frontside" of the support.

The frontside protective layer is the outermost layer on the imaging side of the material that is in direct contact with the imaging means. The backside protective layer is the outermost layer on the side of the support opposite to that containing the imaging layer(s).

"Non-photosensitive" means not intentionally light sensitive. The direct thermographic materials described herein are non-photosensitive meaning that no photosensitive silver halide(s) has been purposely added or created.

"Simultaneous coating" or "wet-on-wet" coating means that when multiple layers are coated, subsequent layers are coated onto the initially coated layer before the initially coated layer is dry.

The sensitometric terms, absorbance, contrast, Dmin, and Dmax have conventional definitions known in the imaging arts. In thermographic materials, Dmin is considered herein as image density in the areas with the minimum application of heat by the thermal print-head. The term Dmax is the maximum image density achieved when the thermographic material is thermally imaged with a given amount of thermal energy. The sensitometric term absorbance is another term for optical density (OD).

"Transparent" means capable of transmitting visible light or imaging radiation without appreciable scattering or absorption.

The phrases "silver salt" and "organic silver salt" refer to an organic molecule having a bond to a silver atom. Although the compounds so formed are technically silver coordination complexes or silver compounds they are often referred to as silver salts.

The terms "double-sided," "double-faced coating," and "duplitized" are used to define thermographic materials having one or more of the same or different thermographic layers disposed on both sides (frontside and backside) of the support.

"Silver Efficiency" is defined as Dmax divided by the silver coating weight. It is a measure of the amount of silver that has developed under a given set of exposure and development conditions.

As is well understood in this art, for the chemical compounds herein described, substitution is not only tolerated, but is often advisable and various substituents are anticipated on the compounds used in the present invention unless otherwise stated. Thus, when a compound is referred to as "having the structure" of a given formula, any substitution that does not alter the bond structure of the formula or the shown atoms within that structure is included within the formula, unless such substitution is specifically excluded by language (such as "free of carboxy-substituted alkyl").

As a means of simplifying the discussion and recitation of certain substituent groups, the term "group" refers to chemical species that may be substituted as well as those that are not so substituted. Thus, the term "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms (F, Cl, Br, and I), cyano, nitro, amino, and carboxy. For example, alkyl group can include ether and thioether groups (for example $CH_3—CH_2—CH_2—O—CH_2—$ and $CH_3—CH_2—CH_2—S—CH_2—$), haloalkyl, nitroalkyl, alkylcarboxy, carboxyalkyl, carboxamido, hydroxyalkyl, sulfoalkyl, and other groups readily apparent to one skilled in the art. A skilled artisan would exclude substituents that adversely react with other active ingredients as not being inert or harmless.

Research Disclosure (http://www.researchdisclosure.com) is a publication of Kenneth Mason Publications Ltd., The Book Barn, Westbourne, Hampshire PO10 8RS, UK. It is also available from Emsworth Design Inc., 200 Park Avenue South, Room 1101, New York, N.Y. 10003.

Other aspects, advantages, and benefits of the present invention are apparent from the detailed description, examples, and claims provided in this application.

Non-Photosensitive Source of Reducible Silver Ions

The non-photosensitive source of reducible silver ions used in the direct thermographic materials can be any silver-organic compound that contains reducible silver(I) ions. Such compounds are generally silver salts of silver coordinating ligands. Preferably, it is an organic silver salt that is comparatively stable to light and forms a silver image when heated to 50° C. or higher in the presence of a reducing agent. Mixtures of the same or different types of silver salts can be used if desired.

Suitable organic silver salts include silver salts of organic compounds having a carboxylic acid group. Examples thereof include silver salts of aliphatic and aromatic carboxylic acids. Silver salts of long-chain aliphatic carboxylic acids are preferred. The chains typically contain 10 to 30, and preferably 15 to 28, carbon atoms. Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Preferably, silver behenate is used alone or in mixtures with other silver salts.

In some embodiments, a highly crystalline silver behenate can be used as part or all of the non-photosensitive sources of reducible silver ions as described in U.S. Pat. No. 6,096,486 (Emmers et al.) and U.S. Pat. No. 6,159,667 (Emmers et al.), both incorporated herein by reference. Moreover, the silver behenate can be used in its one or more crystallographic phases (such as a mixture of phases I, II and/or III) as described in U.S. Pat. No. 6,677,274 (Geuens et al.) that is incorporated herein by reference.

Other useful but less preferred silver salts include but are not limited to, silver salts of aromatic carboxylic acids and other carboxylic acid group-containing compounds, silver salts of aliphatic carboxylic acids containing a thioether group as described in U.S. Pat. No. 3,330,663 (Weyde et al.), silver carboxylates comprising hydrocarbon chains incorporating ether or thioether linkages, or sterically hindered substitution in the α- (on a hydrocarbon group) or ortho- (on an aromatic group) position, as described in U.S. Pat. No. 5,491,059 (Whitcomb), silver salts of aliphatic, aromatic, or heterocyclic dicarboxylic acids, silver salts of sulfonates as described in U.S. Pat. No. 4,504,575 (Lee), silver salts of sulfosuccinates as described in EP 0 227 141 A1 (Leenders et al.), silver salts of acetylenes as described in U.S. Pat. No. 4,761,361 (Ozaki et al.) and U.S. Pat. No. 4,775,613 (Hirai et al.), silver salts of compounds containing mercapto or thione groups and derivatives thereof (such as those having a heterocyclic nucleus containing 5 or 6 atoms in the ring, at least one of which is a nitrogen atom), as described in U.S. Pat. No. 4,123,274 (Knight et al.) and U.S. Pat. No. 3,785,830 (Sullivan et al.), silver salts of mercapto or thione substituted compounds that do not contain a heterocyclic nucleus, silver salts of compounds containing an imino group (such as silver salts of benzotriazole and substituted derivatives thereof), silver salts of 1,2,4-triazoles or 1-H-tetrazoles as described in U.S. Pat. No. 4,220,709 (deMauriac), and silver salts of imidazole and substituted imidazoles as described in U.S. Pat. No. 4,260,677 (Winslow et al.).

It is also convenient to use silver half soaps that are blends of silver carboxylates and carboxylic acids each having from 10 to 30 carbon atoms, and preferably from 15 to 28 carbon atoms.

The methods used for making silver soap emulsions are well known in the art and are disclosed in *Research Disclosure*, April 1983, item 22812, *Research Disclosure*, October 1983, item 23419, U.S. Pat. No. 3,985,565 (Gabrielsen et al.), and the references cited above.

Non-photosensitive sources of reducible silver ions can also be provided as core-shell silver salts such as those described in U.S. Pat. No. 6,355,408 (Whitcomb et al.) or as silver dimer compounds that comprise two different silver salts as described in U.S. Pat. No. 6,472,131 (Whitcomb), both of which are incorporated herein by reference.

Still other useful sources of non-photosensitive reducible silver ions are the silver core-shell compounds comprising a primary core comprising one or more photosensitive silver halides, or one or more non-photosensitive inorganic metal salts or non-silver containing organic salts, and a shell at least partially covering the primary core, wherein the shell comprises one or more non-photosensitive silver salts, each of which silver salts comprises a organic silver coordinating ligand. Such compounds are described in U.S. Pat. No. 6,803,177 (Bokhonov et al.) that is incorporated herein by reference.

The one or more non-photosensitive sources of reducible silver ions are preferably present in an amount of from about 5% to about 70% (more preferably, from about 10% to about 50%), based on the total dry weight of the emulsion layers. Stated another way, the amount of the sources of reducible silver ions is generally present in an amount of from about 0.001 to about 0.2 mol/m$^2$ of the thermographic material, and preferably from about 0.006 to about 0.012 mol/m$^2$ of that material.

Reducing Agents

The thermographic materials include one or more reducing agents (of the same or different types) to reduce the silver ions during imaging. Such reducing agents are well known to those skilled in the art and include, for example, aromatic di- and tri-hydroxy compounds having at least two hydroxy groups in ortho- or para-relationship on the same aromatic nucleus such as hydroquinone and substituted hydroquinones, catechols, pyrogallol, gallic acid and gallic acid esters (for example, methyl gallate, ethyl gallate, propyl gallate), and tannic acid.

Particularly preferred are catechol-type reducing agents having no more than two hydroxy groups in an ortho-relationship.

One particularly preferred class of catechol-type reducing agents are benzene compounds in which the benzene nucleus is substituted by no more than two hydroxy groups which are present in 2,3-position on the nucleus and have in the 1-position of the nucleus a substituent linked to the nucleus by means of a carbonyl group. Compounds of this type include 2,3-dihydroxy-benzoic acid, and 2,3-dihydroxy-benzoic acid esters (such as methyl 2,3-dihydroxy-benzoate, and ethyl 2,3-dihydroxy-benzoate).

Another particularly preferred class of catechol-type reducing agents are benzene compounds in which the benzene nucleus is substituted by no more than two hydroxy groups which are present in 3,4-position on the nucleus and have in the 1-position of the nucleus a substituent linked to the nucleus by means of a carbonyl group. Compounds of this type include, for example, 3,4-dihydroxy-benzoic acid, 3-(3,4-dihydroxy-phenyl)-propionic acid, 3,4-dihydroxy-benzoic acid esters (such as methyl 3,4-dihydroxy-benzoate, and ethyl 3,4-dihydroxy-benzoate), 3,4-dihydroxy-benzaldehyde, and phenyl-(3,4-dihydroxyphenyl)ketone. 3,4-Dihydroxybenzonitrile is also useful. Such compounds are described, for example, in U.S. Pat. No. 5,582,953 (Uyttendaele et al.) that is incorporated herein by reference.

Mixtures of catechol reducing agents with various substituents can be used to optimize reactivity, Dmax, Dmin, and other imaging properties of the thermographic material.

Still another particularly useful class of reducing agents are the polyhydroxy spiro-bis-indane compounds that are described in U.S. Pat. No. 3,440,049 (Moede) and U.S. Pat. No. 5,817,598 (Defieuw et al.), both incorporated herein by reference.

In some constructions, "hindered phenol reducing agents" can be used. "Hindered phenol reducing agents" are compounds that contain only one hydroxy group on a given phenyl ring and have at least one additional substituent located ortho to the hydroxy group.

One type of hindered phenol includes hindered phenols and hindered naphthols.

Another type of hindered phenol reducing agents are hindered bis-phenols. These compounds contain more than one hydroxy group each of which is located on a different phenyl ring. This type of hindered phenol includes, for example, binaphthols (that is dihydroxybinaphthyls), biphenols (that is dihydroxybiphenyls), bis(hydroxynaphthyl) methanes, bis(hydroxyphenyl)-methanes bis(hydroxyphenyl)ethers, bis(hydroxyphenyl)sulfones, and bis(hydroxyphenyl)thioethers, each of which may have additional substituents.

Preferred hindered phenol reducing agents are bis(hydroxyphenyl)-methanes such as, bis(2-hydroxy-3-t-butyl-5-methylphenyl)methane (CAO-5), 1,1'-bis(2-hydroxy-3,5-dimethylphenyl)-3,5,5-trimethylhexane (NONOX® or PERMANAX® WSO), and 1,1'-bis(2-hydroxy-3,5-dimethylphenyl)isobutane (LOWINOX® 22IB46) Mixtures of hindered phenol reducing agents can be used if desired.

Further reducing agents include certain ortho-amino-phenol, para-amino-phenol, and hydroquinone (that is, para-hydroxy-phenol) compounds described in copending and commonly assigned U.S. Ser. No. 11/012,788 (filed Dec. 15, 2004 by Whitcomb, Olson, Cowdery-Corvan, Sakizadeh, and Ishida) that is incorporated herein by reference.

The reducing agent (or mixture thereof) described herein is generally present in an amount greater than 0.1 mole per mole of silver and at 1 to 10% (dry weight) of the emulsion layer. In multilayer constructions, if the reducing agent is added to a layer other than an emulsion layer, slightly higher proportions, of from about 2 to 15 weight % may be more desirable. Any co-developers may be present generally in an amount of from about 0.001% to about 1.5% (dry weight) of the emulsion layer coating.

Stated another way, the reducing agents described herein can be present in an amount of at least 0.03 mol/mol of total silver. Preferably, they are present in an amount of from about 0.05 to about 2 mol/mol of total silver. The total amount of silver in the thermographic materials is at least 3 mmol/m$^2$ and preferably from about 6 to about 12 mmol/m$^2$.

Other Addenda

The direct thermographic materials can also contain other additives such as toners, shelf-life stabilizers, contrast enhancers, dyes or pigments, post-processing stabilizers or stabilizer precursors, thermal solvents (also known as melt formers), and other image-modifying agents as would be readily apparent to one skilled in the art.

Suitable stabilizers that can be used alone or in combination include thiazolium salts as described in U.S. Pat. No. 2,131,038 (Staud) and U.S. Pat. No. 2,694,716 (Allen), azaindenes as described in U.S. Pat. No. 2,886,437 (Piper), triazaindolizines as described in U.S. Pat. No. 2,444,605 (Heimbach), the urazoles described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. No. 2,566,263 (Trirelli) and U.S. Pat. No. 2,597,915 (Damshroder), compounds having —$SO_2CBr_3$ groups as described in U.S. Pat. No. 5,369,000 (Sakizadeh et al.), U.S. Pat. No. 5,464,747 (Sakizadeh et al.), U.S. Pat. No. 5,594,143 (Kirk et al.) U.S. Pat. No. 5,374,514 (Kirk et al.), and U.S. Pat. No. 5,460,938 (Kirk et al.).

Stabilizer precursor compounds capable of releasing stabilizers upon application of heat during imaging can also be used, as described in U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.).

In addition, certain substituted-sulfonyl derivatives of benzo-triazoles may be used as stabilizing compounds as described in U.S. Pat. No. 6,171,767 (Kong et al.).

"Toners" or derivatives thereof that improve the image are desirable components of the thermographic materials. These compounds, when added to the imaging layer, shift the color of the image from yellowish-orange to brown-black or blue-black. Generally, one or more toners described herein are present in an amount of from about 0.01% to about 10% (more preferably from about 0.1% to about 10%), based on the total dry weight of the layer in which the toner is included. Toners may be incorporated in the thermographic emulsion layer or in an adjacent non-imaging layer.

Compounds useful as toners are described in U.S. Pat. No. 3,074,809 (Owen), U.S. Pat. No. 3,080,254 (Grant, Jr.), U.S. Pat. No. 3,446,648 (Workman), U.S. Pat. No. 3,844,797 (Willems et al.), U.S. Pat. No. 3,847,612 (Winslow), U.S. Pat. No. 3,951,660 (Hagemann et al.), U.S. Pat. No. 4,082,901 (Laridon et al.), U.S. Pat. No. 4,123,282 (Winslow), and U.S. Pat. No. 5,599,647 (Defieuw et al.) and GB 1,439,478 (AGFA).

Additional useful toners are substituted and unsubstituted mercaptotriazoles as described in U.S. Pat. No. 3,832,186 (Masuda et al.), U.S. Pat. No. 5,149,620 (Simpson et al.), U.S. Pat. No. 6,165,704 (Miyake et al.), U.S. Pat. No. 6,713,240 (Lynch et al.), and U.S. Pat. No. 6,841,343 (Lynch et al.), all of which are incorporated herein by reference.

Phthalazine and phthalazine derivatives [such as those described in U.S. Pat. No. 6,146,822 (Asanuma et al.), incorporated herein by reference], phthalazinone, and phthalazinone derivatives are particularly useful toners.

A combination of one or more hydroxyphthalic acids and one or more phthalazinone compounds can be included in the thermographic materials. Hydroxyphthalic acid compounds have a single hydroxy substituent that is in the meta position to at least one of the carboxy groups. Preferably, these compounds have a hydroxy group in the 4-position and carboxy groups in the 1- and 2-positions. The hydroxyphthalic acids can be further substituted in other positions of the benzene ring as long as the substituents do not adversely affect their intended effects in the thermographic material. Mixtures of hydroxyphthalic acids can be used if desired.

Useful phthalazinone compounds are those having sufficient solubility to completely dissolve in the formulation from which they are coated. Preferred phthalazinone compounds include 6,7-dimethoxy-1-(2H)-phthalazinone, 4-(4-pentylphenyl)-1-(2H)-phthalazinone, and 4-(4-cyclohexylphenyl)-1-(2H)-phthalazinone. Mixtures of such phthalazinone compounds can be used if desired.

This combination facilitates obtaining a stable bluish-black image after processing. In preferred embodiments, the molar ratio of phthalazinone to hydroxyphthalic acid is from about 1:1 to about 3:1 and preferably from about 2:1 to about 3.1.

The direct thermographic materials may also include one or more thermal solvents (or melt formers). Combinations of these compounds can also be used, such as a combination of succinimide and dimethylurea. Known thermal solvents are disclosed in U.S. Pat. No. 3,438,776 (Yudelson), U.S. Pat. No. 5,250,386 (Aono et al.), U.S. Pat. No. 5,368,979 (Freedman et al.), U.S. Pat. No. 5,716,772 (Taguchi et al.), and U.S. Pat. No. 6,013,420 (Windender).

The thermographic materials can also include one or more image stabilizing compounds that are usually incorporated in a "backside" layer. Such compounds can include phthalazinone and its derivatives, pyridazine and its derivatives, benzoxazine and benzoxazine derivatives, benzothiazine-dione and its derivatives, and quinazoline-dione and its derivatives, particularly as described in U.S. Pat. No. 6,599,685 (Kong). Other useful backside image stabilizers include anthracene compounds, coumarin compounds, benzophenone compounds, benzotriazole compounds, naphthalic acid imide compounds, pyrazoline compounds, or compounds described in U.S. Pat. No. 6,465,162 (Kong et al.) and GB 1,565,043 (Fuji Photo).

The thermographic materials may also include one or more additional polycarboxylic acids (other than the hydroxyphthalic acids noted above) and/or anhydrides thereof that are in thermal working relationship with the sources of reducible silver ions in the one or more thermographic layers. Such polycarboxylic acids can be substituted or unsubstituted aliphatic (such as glutaric acid and adipic acid) or aromatic compounds and can be present in an amount of at least 5 mol % ratio to silver. They can be used in anhydride or partially esterified form as long as two free carboxylic acids remain in the molecule. Useful polycarboxylic acids are described for example in U.S. Pat. No. 6,096,486 (noted above).

Binders

The non-photosensitive source(s) of reducible silver ions, the reducing agent(s), toners, and any other thermographic layer additives are generally combined with one or more binders that are generally hydrophobic in nature. Thus, organic solvent-based formulations can be used to prepare the thermographic materials.

Examples of typical hydrophobic binders include polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred. Particularly suitable hydrophobic binders are polyvinyl butyral resins that are available under the names MOWI- TAL® (Kuraray America, New York, N.Y.), S-LEC® (Sekisui Chemical Company, Troy, Mich.), BUTVAR® (Solutia, Inc., St. Louis, Mo.), and PIOLOFORM® (Wacker Chemical Company, Adrian, Mich.).

Hardeners for various binders may be present if desired. Useful hardeners are well known and include polyisocyanate compounds as described in EP 0 600 586 B1 Philip, Jr. et al.) and U.S. Pat. No. 6,313,065 (Horsten et al.), vinyl sulfone compounds as described in U.S. Pat. No. 6,143,487 (Philip, Jr. et al.) and EP 0 640 589 A1 (Gathmann et al.), aldehydes and various other hardeners as described in U.S. Pat. No. 6,190,822 (Dickerson et al.).

The binder(s) should be able to withstand the thermal imaging conditions described herein.

The polymer binder(s) is used in an amount sufficient to carry the components dispersed therein. Preferably, a binder is used at a level of from about 10% to about 90% by weight (more preferably at a level of from about 20% to about 70% by weight) based on the total dry weight of the layer.

It is particularly useful in the direct thermographic materials to use predominantly (more than 50% by weight of total binder weight) hydrophobic binders in both imaging and non-imaging layers on both sides of the support. In particular, the outermost layers are generally formulated and disposed on the support with one or more hydrophobic binders such as cellulose ester polymer binders. Of these binders, cellulose nitrate, cellulose acetate, cellulose acetate butyrate, and cellulose acetate propionate are preferred.

Support Materials

The direct thermographic materials comprise a polymeric support that is preferably a flexible, transparent film that has any desired thickness and is composed of one or more polymeric materials, depending upon their use. The supports are generally transparent (especially if the material is used as a photomask) or at least translucent, but in some instances, opaque supports may be useful. They are required to exhibit dimensional stability during thermal imaging and development and to have suitable adhesive properties with overlying layers. Useful polymeric materials for making such supports include polyesters, cellulose acetate and other cellulose esters, polyvinyl acetal, polyolefins, polycarbonates, and polystyrenes. Preferred supports are composed of polyesters or polycarbonates, such as polyethylene terephthalate film.

Opaque supports can also be used, such as dyed polymeric films and resin-coated papers that are stable to high temperatures. Support materials can contain various colorants, pigments, and dyes if desired. For example, the support can contain conventional blue dyes that differ in absorbance from colorants in the various frontside or backside layers as described in U.S. Pat. No. 6,248,442 (Van Achere et al.). Support materials may be treated using conventional procedures (such as corona discharge) to improve adhesion of overlying layers, or subbing or other adhesion-promoting layers can be used.

The support thickness can be within the range of from about 2 to about 15 µm. Preferably, the support thickness is from about 4 to about 10 µm.

Protective Layer

The direct thermographic materials may have at least one non-thermally sensitive protective layer. Such layers can also be known as a "topcoat" or an "overcoat layer." on at least the imaging side of the support. Preferably, this protective layer is the outermost layer on the imaging side. A wide variety of materials are useful as binders or other components in such outermost protective layers as described in U.S. Pat. No. 5,536,696 (Horsten et al.), U.S. Pat. No. 5,817,598 (Defieuw et al.), and U.S. Pat. No. 6,313,065 (noted above). Such protective layers can include matte agents (organic or inorganic particles), "slip" agents, lubricants, pigments, "thermomeltable" particles, reinforcing agents, antistatic agents, conductive agents, coating aids, and tinting agents. It is particularly desired that the outermost protective layer have a dynamic coefficient of friction of less than 0.3 when the thermographic material is moved in contact and relative to an imaging means such as a thermal print-head (including an array of thermal print-heads). This "slip" property is usually provided by incorporating one or more lubricants into the outermost protective layer. The protective layer can include mixtures of lubricants such as one or more solid lubricants and one or more liquid lubricants.

In some embodiments, the thermographic materials comprise an outermost protective layer on the imaging side that comprises two or more specific lubricants from designated classes of compounds. The protective layer provides both protective and transport (or "slip") properties. Useful protective layers and their methods of preparation are described in copending and commonly assigned U.S. Ser. No. 10/767,757 (filed Jan. 28, 2004 by Kenney, Foster, and Johnson) incorporated herein by reference.

More particularly, the protective layer can comprise one or more lubricants from one or more of the following categories of compounds:

(a) solid polymers, each derived from one or more olefins and from one or more ethylenically unsaturated polymerizable carboxylic acids or esters or anhydrides thereof, (b) branched α-olefin polymers, (c) additional waxes other than compounds in categories of (a) and (b), and (d) silicone oils.

Category (a) includes solid polymers derived from one or more olefins and from one or more ethylenically unsaturated polymerizable carboxylic acids or ester or anhydrides thereof. Suitable polymers include those described in U.S. Pat. No. 3,590,076 (Heintzelman et al.) that is incorporated herein by reference in its entirety. The number average molecular weight of the solid polymer is generally from about 300 to about 5000. Mixtures of these solid polymers can be used.

For example, a category (a) polymer includes maleic anhydride polyethylene, maleic acid anhydride polypropylene, iso-propylmaleate polyethylene, and iso-propylmaleate polypropylene graft copolymers.

Category (b) lubricants are branched α-olefin polymers or mixtures thereof. The branched hydrocarbon typically has a number average molecular weight (as measured by vapor pressure osmometry) of at least 300, preferably at least 400, and more preferably at least 500. It typically has a number average molecular weight of no more than 10,000, preferably no more than 5,000, and more preferably no more than 3,000, although the molecular weight can be outside of these ranges. The branched hydrocarbon typically has a melting point (for crystalline materials) or a softening point (for amorphous or semi-crystalline materials) of at least 30° C., preferably at least 35° C., and more preferably at least 50° C., and typically has a melting point or softening point of no more than 120° C., although the melting point can be outside of these ranges. The branched hydrocarbon can be saturated or unsaturated, and can include cyclic moieties. In addition, oxidized hydrocarbons, such as polyethylene-based oxidized materials and microcrystalline-based oxidized materials can be used, as can unsaturated and branched hydrocarbon-like molecules using as a core cyclic compounds or dendrimer or arborols.

Some polymerized α-olefins are commercially available for example, from the Baker Petrolite Corporation (Sugar Land, Tex.) under the tradename VYBAR®, that is available as a solid (for example VYBAR® 103, VYBAR® 260) or liquid (for example VYBAR® 825).

Examples of suitable branched hydrocarbons include VYBAR® 253, a poly(α-olefin) having a number average molecular weight of about 520, a softening point of about 67° C. (measured by ASTM method D36) and a degree of branching of from about 5 to about 10. Also suitable for use are VYBAR® 103 having a number average molecular weight of about 4400, VYBAR® 260 having a number average molecular weight of about 2,600, and the VYBAR® X-series polymers, such as X-6044, X-6059, and X-6028. Also useful are oxidized hydrocarbons such as those available from Baker Petrolite Corp. as polyethylene-based oxidized materials and microcrystalline-based oxidized materials, such as the CARDIS® and PETRONAUBA® materials.

The third category (c) compounds include any suitable wax that will form a hydrophobic coating. Thus, animal, vegetable, mineral and synthetic waxes may be employed, as may be mixtures thereof.

Generally speaking, a wax is a substance that is a solid at ambient temperature and that has a low viscosity at just above its melting point. Typically, a wax is a substance having the following properties: (1) crystalline to microcrystalline structure, (2) capacity to acquire gloss when rubbed (as distinct from greases), (3) capacity to produce pastes or gels with suitable solvents or when mixed with other waxes, (4) low viscosity at just above the melting point. See *Grant & Hackh's Chemical Dictionary* (5$^{th}$ Edition), page 628, hereby incorporated by reference. Waxes differ from fats in that fats are esters of trihydric lower alcohols.

One preferred additional wax is the fully saturated homopolymer of a low molecular weight polyethylene (such as a low molecular weight polyolefin), or copolymers of various alkene monomers that form polymers with a molecular weight at or below 3,000, a melting point below 130° C., and low melt viscosities. Applicable waxes could include POLYWAX® that is available from Baker Petrolite Corp. Another preferred wax is carnauba wax available as a dispersion from Elementis Specialties (Hightstown, N.J.) under the name SLIP-AYD® SL 508.

POLYWAX® is a linear polyethylene wax. A particularly preferred wax is POLYWAX® 400, CAS [9002-88-4], described as polyethylene homopolymer with weight average molecular weight of about 450 and a melting point of 81° C. (177.8° F.). Additional information on this material can be found at the website for POLYWAX® 400:

<http://www.bakerhughes.com/bakerpetrolite/polymers/ethylene_homopolymers.htm>.

In preferred embodiments, component (c) is a microcrystalline wax, carnauba wax, petronauba wax, paraffin wax, candelilla wax, or a linear low molecular weight polyethylene wax.

Silicone oils useful in category (d) include poly(diphenylphenylmethylsiloxane), poly(diphenylsiloxane), poly(methylethylsiloxane), poly(methylbutylsiloxane), poly(methylhexylsiloxane), and polydimethylsiloxane). Silicone oils can also possess a variety of terminating groups, including trimethylsilyl, distearate, perfluorooctadecyl, and aminopropyl. Particularly preferred silicone oils are aminopropyl terminated poly(dimethylsiloxane)s that are available from Gelest, Inc. (Morrisville, Pa.).

The total amount of lubricants in the protective layer is generally of from about 0.01 to about 1.5 g/m$^2$ and preferably from about 0.1 to about 0.5 g/m$^2$.

One or more binders may also be used in the protective layer. In preferred embodiments, polymeric thermoplastic binders are employed. Examples of such materials include but are not limited to, poly(styrene/acrylonitrile) (for example a 70/30 monomer weight ratio), polyvinyl butyral (available commercially as BUTVAR® B-79 or S-LEC® BL5Z or MOWITAL® SB45H), poly(vinyl alcohol-co-acetal), poly(vinyl alcohol-co-benzal), polystyrene, poly(vinyl acetate), cellulose acetate butyrate (available commercially as CAB 171-15), cellulose acetate propionate, cellulose acetate, ethyl cellulose, cellulose triacetate, poly(methyl methacrylate), and copolymers derived from methyl methacrylate. In preferred embodiments of the invention, the binder is CAB 171-15.

The amount of the binder(s) present in the protective layer is generally in an amount of from about 50 to about 95 weight % of the total protective layer.

The protective layer can also contain matting agents such as particles of starch, titanium dioxide, zinc oxide, silica, calcium carbonate, and polymeric beads including beads of the type described in U.S. Pat. No. 2,992,101 (Jelley et al.) and U.S. Pat. No. 2,701,245 (Lynn). The matting agents can be composed of any useful material and may have an average size in relation to the protective layer thickness that enables at least some of them to protrude through the outer surface of the protective layer, as described for example, in U.S. Pat. No. 5,536,696 (noted above). If matting agents are present, they generally comprise from about 0.2 to about 10 dry weight % of the protective layer. It may be desirable that the outermost protective layer that is in contact with thermal imaging means has a dynamic coefficient of friction less than 0.3 as described in U.S. Pat. No. 5,817,598 (noted above), incorporated herein by reference for the measurement of coefficient of friction. This may be accomplished with an appropriate use of lubricants and matting agents as one skilled in the art would readily understand.

In particular, the outermost layers are generally formulated with one or more hydrophobic binders such as cellulose ester polymer binders. Of these binders, cellulose nitrate, cellulose acetate, cellulose acetate butyrate, and cellulose acetate propionate are preferred.

If desired, the protective layers can include one or more polyisocyanate crosslinking agents to "harden" the layer(s). Useful polyisocyanate crosslinking agents are described for example in U.S. Pat. No. 6,313,065 (noted above), U.S. Pat. No. 5,275,932 (noted above), and U.S. Pat. No. 5,578,548 (noted above), all incorporated herein by reference. Various catalysts such as tertiary amines can be used in combination with the polyisocyanates.

Polymeric fluorinated surfactants may also be useful in the protective layer as described in U.S. Pat. No. 5,468,603 (Kub).

In addition, nanometer size particles can be used as reinforcing agents in the protective layer. Such particles are described in for example, in U.S. Patent Application Publication 2004/0198602 (Pham) that is incorporated herein by reference.

In general, the outermost protective layer has a dry thickness of from about 0.1 to about 10 μm. Preferably the protective layer dry thickness is from about 1 to about 6 μm, and more preferably, it is from about 2 to about 5 μm.

Alternatively, and preferably, the direct thermographic materials have two non-thermally sensitive protective layers on at least the imaging side of the support. These two protective layers are in direct contact with each other. The outermost ("first") protective layer is farther from the support than the innermost ("second") protective layer. The first protective layer is preferably the outermost layer of the thermographic material but it does not need to be if a desirable "slip" layer is applied over it. However, since the first protective layer contains predominantly all of the lubricants and matte agents used to facilitate transport during imaging, it can serve as the "slip" layer. The second protective layer is substantially free of lubricants and matte agents meaning that none are purposely incorporated therein but some may migrate from overlying or underlying layers.

By locating the lubricants, matte agents, and other components desired to facilitate transport in the outermost (or "first") protective layer, less lubricant can be used and still achieve the desired "slip" properties. It is particularly desired that the outermost ("first") protective layer have a dynamic coefficient of friction of less than 0.3 when the thermographic material is moved in contact and relative to an imaging means such as a thermal print-head. This "slip" property is usually provided by incorporating one or more lubricants into the outermost protective layer. Mixtures of lubricants such as one or more solid lubricants and one or more liquid lubricants can be used. The dynamic coefficient of friction can be measured as described in U.S. Pat. No. 5,817,598 (noted above).

In duplitized thermographic materials, the same or different first and second protective layers can be disposed on both sides of the support as long as the first protective layer is farther from the support on both sides thereof and the second protective layer on both sides of the support is substantially free of lubricants and matte agents.

When present, matting agents are preferably located in the first protective layer.

In dual-protective layer constructions, the first protective layer has a dry thickness of from about 0.1 to about 5 μm, preferably from about 0.3 to about 3 μm, and more preferably, from about 1 to about 2 μm. The second protective layer generally has a dry thickness of from about 0.1 to about 5 μm, preferably from about 0.5 to about 4 μm, and more preferably from about 1 to about 3 μm. The ratio of dry thickness of the first protective layer to the second protective layer is generally from about 1:20 to about 3:1 and preferably from about 1:10 to about 2:1.

Additional details regarding direct thermographic materials having dual protective layers and their use can be found in copending and commonly assigned U.S. Ser. No. 11/166,309 (filed on even date herewith by Kenney, Baird, Kub, Ishida, and Ramsden, entitled "Direct Thermographic Materials with Dual Protective Layers") that is incorporated herein by reference.

Non-Light Sensitive Adhesive Layer

The thermographic materials include a non-light sensitive adhesive layer between the support and one or more thermographic layers on each side of the support that includes thermographic layers. This adhesion layer is sometimes called a "carrier" layer when the non-light sensitive adhesion layer formulation is applied simultaneously with and "carries" the thermographic layer coating formulations onto the support. Details about such coating techniques and compositions of "carrier" layer formulations are provided in U.S. Pat. No. 6,436,622 (Geisler), incorporated herein by reference. Simultaneous multilayer coating using carrier layers is preferred in high-speed manufacturing processes. If the thermographic material is duplitized, the non-light sensitive adhesive layer can have the same or different composition and thickness on both sides of the support. For the remainder of this section, the term "carrier" layer will be used in reference to the non-light sensitive adhesive layer. In preferred embodiments, the carrier layer is the only layer between the support and the thermographic layers on either or both sides of the support. Thus, the carrier layer is directly disposed on the support without the use of additional primer or subbing layers and allows the support can be used in an "untreated" and "uncoated" form before application of the carrier layer and other layers.

The carrier layer formulation comprises one or more polyisocyanate crosslinking agents dispersed within one or more hydrophobic crosslinkable polymer binders. Such crosslinking agents have at least two isocyanate groups that may or may not be blocked with groups that are readily displaced during the hardening or crosslinking action. Thus, by "polyisocyanate," we mean to include "polyisocyanate precursor compounds." The polyisocyanates can comprise aliphatic, cycloaliphatic, or aromatic groups, or a combination thereof. They are also intended to include "polymeric isocyanates" that are polymeric compounds having repeating isocyanate groups along the polymer backbone.

As used herein, "aromatic" polyisocyanates are intended to include compounds having the isocyanate group attached directly to a carbocyclic aromatic group, while "aliphatic" and "cycloaliphatic" polyisocyanates, while they may contain aromatic groups, have the isocyanate group attached only to a fully saturated carbon atom. The aromatic polyisocyanates are preferred in the practice of this invention.

More particularly, useful polyisocyanate crosslinking agents can be represented by the following Structure (I):

$$O=C=N-L-(N=C=O)_m \qquad (I)$$

wherein L is a linking group comprising an alkylene group having at least 6 carbon atoms, a cycloalkylene group, or an arylene group, and m is an integer of at least 1 (preferably, 1, 2, or 3, and more preferably 1 or 2). L can also include any combination of one or more alkylene, cycloalkylene, or arylene groups that are separated by hetero linking groups such as oxy, carbonyl, thio, sulfonyl, sulfonamido, imino, and isocyanurate groups as long as such groups do not adversely affect the crosslinking function of the polyisocyanate (for example, cause crosslinking of the polyisocyanate with itself).

By "alkylene" group, we mean substituted or unsubstituted hydrocarbon chains having 6 to 18 carbon atoms in the chain wherein possible substituents include alkoxy, isocyanurate, and other groups that would not adversely affect the compound's crosslinking function. Preferably, the substituted or unsubstituted alkylene group has 6 to 12 carbon atoms.

By "cycloalkylene" group, we mean a substituted or unsubstituted cyclic hydrocarbon chain having 6 to 18 carbon atoms in the chain wherein possible substituents include alkoxy and other groups that would not adversely affect the compounds crosslinking function. Preferably, the substituted or unsubstituted cycloalkylene group has 6 to 12 carbon atoms.

By "arylene" group, we mean a substituted or unsubstituted carbocyclic aromatic group such as a substituted or unsubstituted phenylene, biphenylene, or naphthylene group having one or more substituents that would not adversely affect the compounds crosslinking function. Preferably, L is a substituted or unsubstituted phenylene group.

Representative polyisocyanate crosslinking agents include the following compounds (some with identified commercial Trade Names):

Toluene (2,4 or 2,6)-diisocyanate and derivatives thereof such as (DESMODUR® L-75, CB-55N, and CB-75N),
Naphthalene 1,5-diisocyanate,
4,4'-Diisocyanatodiphenylmethane (DESMODUR® VL),
3,3'-Dimethylbiphenyl-4,4'diisocyanate,
p-Phenylene diisocyanate,
Triphenylmethane triisocyanate,
Tris-(4-isocyanatophenyl)thiophosphate (DESMODUR RFE), 3,3'-Dimethoxy-4,4'-biphenyl diisocyanate
Polyisocyanurate of toluene diisocyanate (DESMODUR® RN),
Hexamethylene diisocyanate and derivatives thereof (such as biuret derivatives and isocyanurate trimers) such as DESMODUR® N-100, N75, N-3000, and N-3300,
m-Xylylene diisocyanate,
Isophorone diisocyanate (DESMODUR I), and Cyclohexyl diisocyanate,
4,4'-Dicyclohexylmethane diisocyanate (DESMODUR® W), trimethyl-hexamethylene diisocyanate, and mixtures thereof.

Preferred isocyanates include toluene (2,4 or 2,6)-diisocyanate and derivatives thereof, naphthalene 1,5-diisocyanate, 4,4'-diisocyanato-diphenylmethane, p-phenylene diisocyanate, triphenylmethane triisocyanate, tris-(4-isocyanatophenyl)thiophosphate, 3,3'-dimethyl-4,4'-biphenyl diisocyanate, and 3,3'-dimethoxy-4,4'-biphenyl diisocyanate. The most preferred polyisocyanates include toluene (2,4 or 2,6)-diisocyanate and derivatives thereof such as DESMODUR® L-75, DESMODUR® CB-55N, and DESMODUR® CB-75N.

Besides the commercial sources noted below, polyisocyanates can also be obtained from Aldrich Chemical Company and number of other chemical supply companies.

The polyisocyanate crosslinking agent is generally present in an amount of at least 10%, preferably from about 10 to about 75%, and more preferably from about 10% to about 30%, based on the dry weight of the hydrophobic crosslinkable polymer binders in the carrier layer coating formulation. The choice and amount of polyisocyanate is dependent upon the type and amount of crosslinkable polymer binders in the carrier layer as well as the rate of crosslinking desired.

To enhance crosslinking of the polymer binders, the carrier layer may also include one or more "catalysts" that are known to accelerate the rate of reaction. Such compounds include, but are not limited to, tertiary amines such as DESMORAPID® PP and diazabicyclooctane (DABCO) and transition metal catalysts such as dibutyltin laurate, bismuth neodecanoate and zinc octanoate. Such catalysts can be present in an amount of at least 0.004 g/g of polyisocyanate, and preferably from about 0.001 to about 0.01 g/g of polyisocyanate.

The hydrophobic crosslinkable binders in the carrier layer are water-insoluble polymers that have active sites that will react with an isocyanate group. Such reactive sites include substituents with reactive hydrogen atoms, such as hydroxy groups, thiol groups, carboxy groups, amino groups, amido groups, and other groups readily apparent to one skilled in polymer chemistry. Examples of useful hydrophobic crosslinkable polymer binders include, but are not limited to, polyvinyl acetal resins (such as polyvinyl butyral), cellulosic polymers, polyesters, polycarbonates, epoxy resins, rosin polymers, polyketone resins, vinyl polymers, maleic anhydride ester copolymers. Such polymers can be obtained from several commercial sources or prepared using known starting materials and reaction conditions.

Preferably, the carrier layer comprises a single-phase mixture of two or more different hydrophobic polymer binders that include a "first" polymer serving to promote adhesion of the carrier layer to the polymeric support, and a "second" polymer. In such embodiments, the first polymer can be a polyvinyl acetal, cellulosic polymer, polyester, polycarbonate, epoxy resin, rosin polymer, polyketone resin, vinyl polymer, or maleic anhydride ester copolymer, and the second polymer can be a polyvinyl acetal resin, cellulosic resin, vinyl polymer, or maleic anhydride-ester copolymer. More preferably, the first polymer is a polyester and the second polymer is a polyvinyl acetal or a cellulosic polymer. Upon coating and drying, crosslinking occurs by reaction of the polyisocyanate with active sites on at least one of the two or more polymer binders.

It is also desirable that the second polymer be compatible with the film-forming polymer binder(s) of the one or more thermographic layers. For example, the thermographic layers and the carrier layer independently can contain at least one polyvinyl acetal or cellulosic polymer binder.

Representative "second" polymers include polyvinyl acetals, cellulosic polymers, vinyl polymers (as defined above for the "first" polymer), acrylate and methacrylate polymers, and maleic anhydride-ester copolymers. The most preferred "second" polymers are polyvinyl acetals (such as polyvinyl butyral) and cellulosic ester polymers (such as cellulose acetate, cellulose diacetate, cellulose triacetate, cellulose acetate propionate, hydroxymethyl cellulose, cellulose nitrate, and cellulose acetate butyrate). Polyvinyl butyral is a particularly preferred second polymer. Of course, mixtures of these second polymers can be used in the carrier layer. These second polymers are also soluble or dispersible in the organic solvents described above.

The weight ratio of "first" polymer to "second" polymer in the carrier layer is generally from about 1:9 to about 1:1, and preferably from about 2:8 to about 4:6. A most preferred polymer combination is of polyester and polyvinyl butyral having a weight ratio of about 3:7.

The carrier layer is generally coated out of one or more miscible organic solvents including, but not limited to, methyl ethyl ketone (2-butanone, MEK), acetone, toluene, tetrahydrofuran, ethyl acetate, ethanol, methanol, or any mixture of any two or more of these solvents.

Further details about formulating and coating the carrier layer are found in U.S. Pat. No. 6,436,622 (noted above), incorporated herein by reference.

The carrier layer can also include other components such as dyes, and stabilizers in conventional amounts.

The carrier layer generally has a dry thickness of from about 0.005 to about 5 µm, and preferably from about 0.1 to about 1 µm.

Thermographic Formulations and Constructions

An organic-based formulation for the thermographic emulsion layer(s) can be prepared by dissolving or dispersing the binder, the source of non-photosensitive silver ions, the reducing agent, and other addenda in an organic solvent, such as toluene, 2-butanone (methyl ethyl ketone), acetone, methanol, or tetrahydrofuran (or mixtures thereof).

The direct thermographic materials can be constructed of two or more layers on the imaging side of the support. Two-layer materials would include a carrier layer and a single thermographic layer. The single thermographic layer would contain the non-photosensitive source of reducible silver ions, the reducing agent, the binder, as well as other optional materials such as toners, stabilizers, and other adjuvants.

The direct thermographic materials can be three-layer constructions comprising a carrier layer, a thermographic layer, and an outermost protective layer. Alternatively, three-layer constructions can comprise two thermographic layers containing desired components and a carrier layer.

The direct thermographic materials can contain plasticizers and lubricants such as poly(alcohols) and diols as described in U.S. Pat. No. 2,960,404 (Milton et al.), fatty acids or esters as described in U.S. Pat. No. 2,588,765 (Robijns) and U.S. Pat. No. 3,121,060 (Duane), and silicone resins as described in GB 955,061 (DuPont). The materials can also contain inorganic and organic matting agents as described in U.S. Pat. No. 2,992,101 (Jelley et al.) and U.S. Pat. No. 2,701,245 (Lynn). Polymeric fluorinated surfactants may also be useful in one or more layers as described in U.S. Pat. No. 5,468,603 (noted above).

Mottle and other surface anomalies can be reduced in the materials of this invention by incorporation of a fluorinated polymer as described in U.S. Pat. No. 5,532,121 (Yonkoski et al.) or by using particular drying techniques as described in U.S. Pat. No. 5,621,983 (Ludemann et al.).

Layers to reduce emissions from the film may also be present, including the polymeric barrier layers described in U.S. Pat. No. 6,352,819 (Kenney et al.), U.S. Pat. No. 6,352,820 (Bauer et al.), U.S. Pat. No. 6,420,102 (Bauer et al.), and U.S. Pat. No. 6,746,831 (Hunt), and in U.S. Patent Application Publication 2004/0126719 (Geuens et al.), all incorporated herein by reference.

The direct thermographic materials may also usefully include a magnetic recording material as described in *Research Disclosure*, Item 34390, November 1992, or a transparent magnetic recording layer such as a layer containing magnetic particles on the underside of a transparent support as described in U.S. Pat. No. 4,302,523 (Audran et al.), incorporated herein by reference.

The direct thermographic materials can include one or more conductive or antistatic agents in any of the layers on either or both sides of the support. It is preferred that the conductive or antistatic layer be a non-light sensitive layer and be disposed on the backside of the support and especially where it is buried or underneath one or more other layers such as backside protective layer(s). Such backside layers typically have a water electrode resistivity (WER) of about $10^5$ to about $10^{12}$ ohm/sq. This technique is described in R. A. Elder *Resistivity Measurements on Buried Conductive Layers*, EOS/ESD Symposium Proceedings, Lake Buena Vista, Fla., 1990, pp. 251-254, [EOS/ESD stands for Electrical Overstress/Electrostatic Discharge].

Typical conductive or antistatic agents include metal oxides, soluble salts, evaporated metal layers, or ionic polymers as described in U.S. Pat. No. 2,861,056 (Minsk) and U.S. Pat. No. 3,206,312 (Sterman et al.), insoluble inorganic salts as described in U.S. Pat. No. 3,428,451 (Trevoy), polythiophenes as described in U.S. Pat. No. 5,747,412 (Leenders et al.), electrically conductive polymer particles as described in U.S. Pat. No. 6,709,808 (Lelental et al.), electroconductive underlayers as described in U.S. Pat. No. 5,310,640 (Markin et al.), electronically-conductive metal antimonate particles as described in U.S. Pat. No. 5,368,995 (Christian et al.), and electrically-conductive metal-containing particles dispersed in a polymeric binder as described in EP 0 678 776 A1 (Melpolder et al.).

The preferred non-light sensitive backside layer is a buried antistatic layer comprising metal oxide particles. Additional optional layers can also include an adhesion promoting layer, an antihalation layer, a layer containing a matting agent (such as silica), or a combination of such layers. Preferably, a single outermost protective layer disposed over the buried backside conductive layer performs several or all of the desired additional functions.

The preferred metal oxide particles are generally provided for formulation in inorganic colloidal or sol form in a suitable solvent such as water or a water-miscible solvent such as methanol or other low molecular weight alcohols. The inorganic metal oxide colloids include oxide colloids of zinc, magnesium, silicon, calcium, aluminum, strontium, barium, zirconium, titanium, manganese, iron, cobalt, nickel, tin, indium, molybdenum, or vanadium, or mixtures of these metal oxide colloids. The metal oxides can be doped with other metals such as aluminum, indium, niobium, tantalum or antimony. Tin oxides, antimony tin oxides, and metal antimonates are preferred.

Preferably, the buried backside conductive layer comprises non-acicular metal antimonate particles such as those described in U.S. Pat. No. 6,689,546 (LaBelle et al.), and in copending and commonly assigned U.S. Ser. No. 10/930,428 (filed Aug. 31, 2004 by Ludemann, LaBelle, Koestner, Hefley, Bhave, Geisler, and Philip), U.S. Ser. No. 10/930,438 (filed Aug. 31, 2004 by Ludemann, LaBelle, Philip, Koestner, and Bhave), U.S. Ser. No. 10/978,205 (filed Oct. 29, 2004 by Ludemann, LaBelle, Koestner, and Chen), U.S. Ser. No. 10/999,858 (filed Nov. 30, 2004 Ludemann, Koestner, LaBelle, and Philip), and U.S. Ser. No. 11/000,115 (filed Nov. 30, 2004 by Ludemann, LaBelle, Philip, and Geisler). All of the above patents and patent applications are incorporated herein by reference. Particularly useful backside conductive layers and their formulations are described in more detail below. Several conductive metal antimonates are commercially available from Nissan Chemical Industry, Ltd. (Japan) under the tradename CELNAX® CXZ-401M. The metal antimonate particles in the conductive layer are predominately (more than 50% by weight of total particles) in the form of non-acicular particles as opposed to "acicular" particles. By "non-acicular" particles is meant not needle-like, that is, not acicular. Preferably the metal antimonate is zinc antimonate ($ZnSb_2O_6$).

The conductive layer also includes one or more binder materials that are usually polymers that are generally soluble or dispersible in the organic solvents noted above. Polyvinyl acetals, polyesters, cellulosic ester polymers, and vinyl polymers such as polyvinyl acetate and polyvinyl chloride are particularly preferred, and the polyvinyl acetals, polyesters, and cellulosic ester polymers are more preferred. Blends of these various polymers can also be used to advantage in the conductive layer.

The conductive layer is generally coated out of one or more miscible organic solvents including, but not limited to, methyl ethyl ketone (2-butanone, MEK), acetone, toluene, tetrahydrofuran, ethyl acetate, ethanol, methanol, or any mixture of any two or more of these solvents. Alternatively, the conductive layer can be coated using aqueous solvents and hydrophilic binder or a polymer latex.

In addition to the conductive particles described above, other conductive materials may be present in a buried conductive backside layer or other backside layers. Such compositions include fluorochemicals that are described in U.S. Pat. No. 6,699,648 (Sakizadeh et al.) and U.S. Pat. No. 6,762,013 (Sakizadeh et al.). Both of these patents are incorporated herein by reference.

Layers to promote adhesion of one layer to another in thermographic materials are also known, as described in U.S. Pat. No. 5,891,610 (Bauer et al.), U.S. Pat. No. 5,804,365 (Bauer et al.), and U.S. Pat. No. 4,741,992 (Przezdziecki). Adhesion can also be promoted using specific polymeric adhesive materials as described in U.S. Pat. No. 5,928,857 (Geisler et al.).

Layer formulations described herein can be coated by various coating procedures including wire wound rod coating, dip coating, air knife coating, curtain coating, slide coating, or extrusion coating using hoppers of the type described in U.S. Pat. No. 2,681,294 (Beguin). The formulations can be coated one at a time and dried before application of another layer. Preferably, two or more formulations can be coated simultaneously by coating the multiple layers on top of a first applied layer while that layer is still wet using the same or different coating fluids or solvent mixtures using the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), and U.S. Pat. No. 5,861,195 (Bhave et al.), and GB 837,095 (Ilford). Simultaneous multiple layer slide coating is particularly preferred (for example the crosslinked adhesion-promoting carrier layer, the non-photosensitive thermographic imaging layer, and the one or more protective layers described above).

A typical wet coating thickness for the emulsion layer can be from about 10 to about 200 μm, and the layer can be dried in forced air at a temperature of from about 20° C. to about 100° C. The coated materials can be dried in forced air at a temperature of from about 20° C. to about 100° C. It is preferred that the thickness of the layer be selected to provide maximum image densities greater than about 0.2, and more preferably, from about 0.5 to 5.0 or more, as measured by an X-rite Model 361/V Densitometer equipped with 301 Visual Optics.

Imaging/Development

The direct thermographic materials can be imaged in any suitable manner consistent with the type of material using any suitable source of thermal energy. The image may be "written" simultaneously with development at a suitable temperature using a thermal stylus, a thermal print-head (including an array of thermal print-heads), or a laser, or by heating the material as it is moved while in contact with a heat absorbing material. The thermographic materials may include a dye (such as an IR-absorbing dye) to facilitate direct development by exposure to laser radiation. The dye converts absorbed radiation to heat. Thermal development is carried out with the materials being in a substantially water-free environment and without application of any solvent to the materials.

Use as a Photomask

The direct thermographic materials are sufficiently transmissive in the range of from about 350 to about 450 nm in non-imaged areas to allow their use in a method where there is a subsequent exposure of an ultraviolet or short wavelength visible radiation sensitive imageable medium. For example, imaging and development of the materials affords a visible image. The thermographic materials absorb ultraviolet or short wavelength visible radiation in the areas where there is a visible image and transmit ultraviolet or short wavelength visible radiation where there is no visible image. The materials may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate. Exposing the imageable material to the imaging radiation through the visible image in the thermographic material provides an image in the imageable material. This method is particularly useful where the imageable medium comprises a printing plate and the thermographic material serves as an imagesetting film.

The following examples are provided to illustrate the practice of the present invention and the invention is not meant to be limited thereby.

Materials and Methods for the Experiments and Examples

All materials used in the following examples are readily available from standard commercial sources, such as Aldrich Chemical Co. (Milwaukee, Wis.) unless otherwise specified. All percentages are by weight unless otherwise indicated.

Many of the chemical components used herein are provided as a solution. The term "active ingredient" means the amount or the percentage of the desired material contained in a sample. All amounts listed herein are the amount of active ingredient added unless otherwise specified.

ALBACAR® 5970 is a 1.9 μm precipitated calcium carbonate. It is available from Specialty Minerals, Inc. (Bethlehem, Pa.).

BUTVAR® B-79 is a polyvinyl butyral resin available from Solutia, Inc. (St. Louis, Mo.).

CAB 171-15 and CAB 381-20 are cellulose acetate butyrate resins available from Eastman Chemical Co. (Kingsport, Tenn.).

CELNAX® CX-Z401M is a 40% organosol dispersion of non-acicular zinc antimonate particles in methanol. It was obtained from Nissan Chemical America Corporation (Houston, Tex.).

CERAMER 67 and CERAMER 1608 are waxes of type (a) above and comprise maleic anhydride adducts with polyolefins. They are available from Baker Petrolite Corporation (Sugar Land, Tex.).

DESMODUR® is a class of polyisocyanates available from Bayer Corporation (Pittsburgh, Pa.).

DESMORAPID® PP is an accelerator for the reaction of polyisocyanates and is available from Bayer Corporation (Pittsburgh, Pa.).

DMS-A31 is an aminopropyl-terminated polydimethylsiloxane available from Gelest, Inc. (Morrisville, Pa.).

MEK is methyl ethyl ketone (or 2-butanone).

PARALOID® A-21 is an acrylic copolymer available from Rohm and Haas (Philadelphia, Pa.).

PIOLOFORM® BL-16, BS-18, and LL-4140 are polyvinyl butyral resins available from Wacker Chemical Company (Adrian, Mich.)

SYLOID® 74X6000 is a synthetic amorphous silica that is available from Grace-Davison (Columbia, Md.).

VITEL® PE 2700B and PE 5833B are polyester resins available from Bostik, Inc. (Middleton, Mass.).

VYBAR 103 is a highly branched polyethylene wax from Baker Petrolite Corporation (Sugar Land, Tex.).

Optical Densities were measured using an X-Rite Model 361IV Densitometer (X-Rite Incorporated, Grandville, Mich.).

Adhesion Test

The adhesion to the support of thermographic coatings was measured using a "cross-hatch" adhesion test performed according to ASTM D3359-92A. Non-imaged thermographic samples as well as thermographic samples that had been imaged to a Dmax greater than 3 were evaluated. Frontside coatings were cut with a razor blade in a cross-hatched pattern, a 1 inch (2.54 cm) wide piece of commercially available 3M Type 610 semi-transparent pressure-sensitive tape was placed on the pattern and then quickly lifted off. The amount of coating removed from the film is the measure of adhesion. The adhesion test ratings are from 0 to 5 where 0 refers to complete removal of the coating and 5 refers none or very little coating removed. A rating of "2" or greater is considered to be acceptable for developed samples. 3M Type 610 semi-transparent pressure-sensitive tape was obtained from 3M Company (Maplewood, Minn.).

Preparation and Coating of Backside Layers

All thermographic materials had a buried backside conductive "carrier" layer and an outermost backside layer.

Buried Backside Conductive Carrier Layer Formulation

A buried backside conductive carrier layer formulation was prepared by mixing the following materials:

| | |
|---|---|
| CELNAX ® CX-Z401M (containing 40% active solids) | 50.0 parts |
| MEK | 375 parts |
| VITEL ® PE 2700B LMW | 4.39 parts |
| CAB 381-20 | 17.5 parts |

Outermost Backside Layer Formulation

An outermost backside layer formulation was prepared by mixing the following materials:

| | |
|---|---|
| MEK | 87.2 parts |
| CAB 381-20 | 11.0 parts |
| SYLOID ® 74X6000 | 0.14 parts |

The buried backside conductive layer formulation and outermost backside layer formulation were simultaneously coated onto one side of a 7 mil (178 μm) blue tinted poly(ethylene terephthalate) support. A precision automated multilayer coater equipped with an in-line dryer was used. The backside coatings were dried at approximately 85° C. for 5 minutes. The coating weight of the backside conductive layer was 0.05 g/ft² (0.54 g/m²) and that of the outermost backside layer was 0.4 g/ft² (4.3 g/m²).

The following Examples demonstrate the improvement of adhesion when an isocyanate is incorporated in the frontside carrier layer a thermographic imaging material.

EXAMPLE 1

Preparation of Frontside Thermographic Layer Formulations

Silver Soap Homogenate Formulation

A silver soap thermographic homogenate formulation was prepared with the following components.

| | |
|---|---|
| MEK | 75.5 parts |
| Silver Behenate | 24.0 parts |
| PIOLOFORM ® BL-16 | 0.5 parts |

The materials were mixed and homogenized by passing twice through a homogenizer at 5000 psi (352 kg/cm²). The materials were cooled between the two passes.

Thermographic Emulsion Formulations

Thermographic emulsion layer formulations for Invention Samples 1-1, 1-2, and 1-3 were prepared by mixing the components shown below.

| | |
|---|---|
| Silver Behenate Homogenate | 34.550 parts |
| MEK | 35.870 parts |
| Tetrachlorophthalic acid, TCPA | 0.070 parts |
| 4-Hydroxyphthalic acid | 0.560 parts |
| in Methanol | 5.050 parts |
| Phthalazone | 1.340 parts |
| BUTVAR ® B-79 | 20.720 parts |
| 2,3-Dihydroxybenzoic acid | 0.970 parts |
| 3,4-Dihydroxybenzaldehyde | 0.880 parts |

Thermographic Emulsion layer formulations for Invention Samples 1-4 through 1-9 as well as for Examples 2-6 below were prepared by mixing the components shown below.

| | |
|---|---|
| Silver Behenate Homogenate | 34.667 parts |
| MEK | 37.360 parts |
| Tetrachlorophthalic acid (TCPA) | 0.070 parts |
| 4-Hydroxyphthalic acid (4-HPA) | 0.560 parts |
| in Methanol | 4.000 parts |
| Phthalazone | 1.600 parts |
| BUTVAR ® B-79 | 20.767 parts |
| 2,3-Dihydroxybenzoic acid | 0.977 parts |

Outermost Protective Layer Formulation

Outermost protective layer formulations for Examples 1 and 2 were prepared by mixing the components shown below.

| | |
|---|---|
| MEK | 79.24 parts |
| ALBACAR ® 5970 | 0.82 parts |
| CAB 171-15 | 10.74 parts |
| PARALOID ® A-21 | 1.47 parts |
| Lubricant Premix | 7.74 parts |
| VYBAR ® 103 | 12.5 parts |
| CERAMER ® 1608 | 12.5 parts |
| PIOLOFORM ® BL 16 | 0.5 parts |
| MEK | 74.5 parts |

Frontside Carrier Layer Formulation

Frontside carrier layer formulations were prepared containing the materials in the amounts shown below. All amounts are in parts by weight.

TABLE I

| Sample | MEK | Vitel ® PE 5833B | Pioloform ® LL4140 | Desmodur ® CB-55N |
|---|---|---|---|---|
| Comparative 1-1 | 88.00 | 3.60 | 8.40 | 0 |
| Invention 1-2 | 85.05 | 2.40 | 6.00 | 6.55 |
| Invention 1-3 | 83.09 | 1.80 | 4.20 | 10.91 |
| Invention 1-4 | 86.53 | 2.52 | 7.68 | 3.27 |
| Invention 1-5 | 86.04 | 2.52 | 7.08 | 4.36 |
| Invention 1-6 | 76.73 | 4.20 | 11.80 | 7.27 |
| Invention 1-7 | 85.55 | 2.52 | 6.48 | 5.45 |
| Invention 1-8 | 85.05 | 2.52 | 5.88 | 6.55 |
| Invention 1-9 | 75.09 | 4.20 | 9.80 | 10.91 |

Each of the carrier layer, thermographic emulsion layer, and protective layer formulations were simultaneously coated onto 7 mil (178 μm) blue tinted polyethylene terephthalate support using a precision multilayer slide coater equipped with an in-line dryer. The coatings were dried at 185° F. (85° C.) for about five minutes. The dried coating weight of the carrier layer was 0.05 g/ft² (0.54 g/m²). The dried coating weight of the single thermographic layer was 1.55 g/ft² (16.68 g/m²). The dried coating weight of the outermost protective layer was 0.4 g/ft² (4.31 g/m²).

The resulting thermographic sheets were imaged with an AGFA DryStar™ Model 2000. Sheets were developed to Dmax of greater than 3.0 and compared with an unprocessed sheet.

The results, shown below in TABLE II, demonstrate that Invention Samples 1-2 and 1-3 incorporating isocyanate in the carrier layer show a surprising increase in Dmax (that is, improved silver efficiency) when compared with Comparative Sample 1-1 that does not incorporate isocyanate. Similarly, Invention Samples 1-4 through 1-9 incorporating isocyanate in the carrier layer show also show an increase in Dmax with increasing amount of isocyanate added to the carrier layer.

TABLE II

| Sample | Dmin | Dmax | Unprocessed Adhesion | Dmax Adhesion |
|---|---|---|---|---|
| Comparative 1-1 | 0.205 | 3.24 | 0 | 0 |
| Invention 1-2 | 0.199 | 3.63 | 3.5 | 5 |
| Invention 1-3 | 0.196 | 3.71 | 3 | 5 |
| Invention 1-4 | 0.187 | 3.09 | 5 | 5 |
| Invention 1-5 | 0.177 | 3.17 | 4.5 | 5 |
| Invention 1-6 | 0.179 | 3.20 | 4 | 5 |
| Invention 1-7 | 0.188 | 3.23 | 5 | 5 |
| Invention 1-8 | 0.184 | 3.20 | 5 | 5 |
| Invention 1-9 | 0.183 | 3.20 | 5 | 5 |

EXAMPLE 2

Samples were prepared, coated, dried and imaged as described in Example 1 above, except that DESMODUR® N-3300 was used in place of DESMODUR® CB-55N in the frontside carrier layer formulation. The formulations are shown below in TABLE III.

The results, shown below in TABLE IV, demonstrate excellent adhesion when an isocyanate is used in the carrier layer. They also show that incorporating isocyanate in the carrier layer provides an increase in Dmax (that is, improved silver efficiency) with increasing amount of isocyanate added to the carrier layer.

TABLE III

| Sample | MEK | Vitel® PE 5833B | Pioloform® LL4140 | Desmodur® N-3300 |
|---|---|---|---|---|
| Invention 2-2 | 88.00 | 2.88 | 6.72 | 2.40 |
| Invention 2-3 | 88.00 | 2.52 | 5.88 | 3.60 |
| Invention 2-4 | 88.00 | 2.16 | 5.04 | 4.80 |

TABLE IV

| Sample | Dmin | Dmax | Unprocessed Adhesion | Dmax Adhesion |
|---|---|---|---|---|
| Invention 2-2 | 0.218 | 3.25 | 5 | 4.5 |
| Invention 2-3 | 0.219 | 3.44 | 5 | 4.5 |
| Invention 2-4 | 0.218 | 3.5 | 5 | 5 |

EXAMPLE 3

Outermost protective formulations for Examples 3 and 4 were prepared by mixing the components shown below.

| | |
|---|---|
| MEK | 75.30 parts |
| ALBACAR® 5970 | 0.92 parts |
| PIOLOFORM® BS-18 | 6.17 parts |
| DESMORAPID® PP | 2.44 parts |
| Lubricant Premix | 7.06 parts |
| VYBAR® 103 | 12.5 parts |
| CERAMER® 1608 | 12.5 parts |
| PIOLOFORM® BL 16 | 0.5 parts |
| MEK | 74.5 parts |
| DESMODUR® L-75 | 8.12 parts |

Samples were prepared, coated, dried and imaged as described in Example 1 above, except that DESMODUR® CB-75N was used as the isocyanate in place of DESMODUR® CB-55N in the frontside carrier layer formulation. The formulations, shown below in TABLES V and the results, shown below in TABLE VI, demonstrate excellent adhesion when an isocyanate is used in the carrier layer.

TABLE V

| Sample | MEK | Vitel® PE 5833B | Desmodur® CB-75N |
|---|---|---|---|
| Invention 3-2 | 87.20 | 9.60 | 3.20 |

TABLE VI

| Sample | Dmin | Dmax | Unprocessed Adhesion | Dmax Adhesion |
|---|---|---|---|---|
| Invention 3-2 | 0.201 | 3.74 | 5 | 5 |

EXAMPLE 4

Samples were prepared, coated, dried and imaged as described in Example 1 above, except that DESMODUR® CB-75N was used as the isocyanate in place of DESMODUR® CB-55N in the frontside carrier layer formulation. The formulations, shown below in TABLE VII, and the results, shown below in TABLE IX demonstrate excellent adhesion when an isocyanate is used in the carrier layer.

TABLE VII

| Sample | MEK | Vitel® PE 5833B | Pioloform® LL4140 | Desmodur® L-75 |
|---|---|---|---|---|
| Invention 4-2 | 86.04 | 2.88 | 6.72 | 3.20 |

TABLE VIII

| Sample | Dmin | Dmax | Unprocessed Adhesion | Dmax Adhesion |
|---|---|---|---|---|
| Invention 4-2 | 0.206 | 3.74 | 5 | 5 |

EXAMPLE 5

Outermost protective layer formulations for Examples 5 and 6 were prepared by mixing the components shown below.

| | |
|---|---|
| MEK | 7,947.50 g |
| CAB 171-15 | 1,251.58 g |
| PARALOID® A-21 | 170.72 g |

To this solution was added a dispersion of 95.15 g of ALBACAR® 5970 in 697.73 g of MEK. After stirring for 15 minutes, 563.20 grams of a 20% solids dispersion of CERAMER 67 in MEK was added with stirring and the formulation was stirred for another 15 minutes. A solution of 19.80 g of DMS-A31 in 254.54 g of MEK was then added and stirred for an additional 15 minutes. The resulting protective layer formulation contained 15.0% solids.

Samples were prepared, coated, dried and imaged as described in Example 1 above, except that DESMODUR® L-75 was used as the isocyanate in place of DESMODUR® CB-55N in the frontside carrier layer formulation. The results, shown below in TABLES IX and X demonstrate excellent adhesion when an isocyanate is used in the carrier layer.

TABLE IX

| Sample | MEK | Vitel® PE 5833B | Pioloform® LL4140 | Desmorapid® PP | Desmodur® L-75 |
|---|---|---|---|---|---|
| Invention 5-1 | 86.25 | 2.88 | 6.71 | 0.96 | 3.20 |

TABLE X

| Sample | Dmin | Dmax | Unprocessed Adhesion | Dmax Adhesion |
|---|---|---|---|---|
| Invention 5-2 | 0.222 | 3.76 | 5 | 4 |

EXAMPLE 6

Samples were prepared, coated, dried and imaged as described in Example 1 above, except that DESMODUR® CB-75N was used as the isocyanate in place of DESMODUR® CB-55N in the frontside carrier layer formulation. The results, shown below in TABLES XI and XII demonstrate excellent adhesion when an isocyanate is used in the carrier layer.

TABLE XI

| Sample | MEK | Vitel® PE 5833B | Pioloform® LL4140 | Desmodur® CB-75N |
|---|---|---|---|---|
| Invention 6-2 | 86.04 | 2.52 | 7.08 | 4.36 |

TABLE XII

| Sample | Dmin | Dmax | Unprocessed Adhesion | Dmax Adhesion |
|---|---|---|---|---|
| Invention 6-2 | 0.204 | 3.60 | 5 | 5 |

The invention has been described in detail with particular reference to certain preferred embodiments thereof, but it will be understood that variations and modifications can be effected within the spirit and scope of the invention.

The invention claimed is:

1. A direct thermographic material comprising a polymeric support and having thereon one or more thermographic layers comprising a film-forming polymer binder, and disposed between said polymeric support and said one or more thermographic layers, a non-light sensitive adhesive layer comprising a polyisocyanate-crosslinked hydrophobic polymer binder that is the reaction product of a polyisocyanate crosslinking agent with reactive sites of one or more hydrophobic polymer binders, and wherein said polyisocyanate crosslinking agent is a compound represented by the following Structure I:

$$O{=}C{=}N{-}L{-}(N{=}C{=}O)_m \qquad (I)$$

wherein L is a linking group comprising an alkylene group having at least 6 carbon atoms, a cycloalkylene group, or an arylene group, and m is an integer of at least 1.

2. The material of claim 1 that is a black-and-white thermographic material comprising a non-photosensitive source of reducible silver ions and a reducing agent dispersed in a hydrophobic, organic solvent soluble binder.

3. The material of claim 1 wherein said arylene group comprises a carbocyclic aromatic group and m is 1, 2, or 3.

4. The material of claim 3 wherein L is a phenylene group and m is 1 or 2.

5. The material of claim 1 wherein said polyisocyanate crosslinking agent is one or more of the following compounds:

toluene (2,4 or 2,6)-diisocyanate and derivatives thereof, naphthalene 1,5-diisocyanate, 4,4'-diisocyanatodiphenylmethane, p-phenylene diisocyanate, triphenylmethane triisocyanate, tris-(4-isocyanatophenyl)thiophosphate, 3,3'-dimethyl-4,4'-biphenyl diisocyanate, and 3,3'-dimethoxy-4,4'-biphenyl diisocyanate.

6. The material of claim 1 wherein said polyisocyanate-crosslinked hydrophobic polymer binder that is the reaction product of a polyisocyanate crosslinking agent with reactive sites of a hydrophobic polymer binder in the presence of a tertiary amine or transition metal catalyst.

7. The material of claim 1 wherein said non-light sensitive adhesive layer comprises a single-phase mixture of two or more hydrophobic polymer binders that include a first polymer serving to promote adhesion of said adhesive layer to said polymeric support, and a second polymer, wherein said first and second polymers are different polymers, wherein said first polymer is a polyvinyl acetal, cellulosic polymer, polyester, polycarbonate, epoxy resin, rosin polymer, polyketone resin, vinyl polymer, or maleic anhydride ester copolymer, and said second polymer is a polyvinyl acetal, cellulosic polymer, vinyl polymer, or maleic anhydride-ester copolymer, and wherein at least one of said two or more polymer binders is a polyisocyanate-crosslinked hydrophobic polymer.

8. The material of claim 7 wherein said first polymer is a polyester and said second polymer is a polyisocyanate-crosslinked polyvinyl acetal or cellulosic polymer.

9. The material of claim 7 wherein said second polymer is compatible with said film-forming polymer binder of said one or more thermographic layers.

10. The material of claim 1 wherein said one or more thermographic layers and said non-light sensitive adhesive layer independently contain at least one polyvinyl acetal or cellulosic polymer binder.

11. The material of claim 1 wherein said non-light sensitive adhesive layer has a dry thickness of from about 0.005 to about 5 μm.

12. The material of claim 1 that is duplitized and has the same or different one or more thermographic layers and non-light-sensitive adhesive layers on both sides of said polymeric support.

13. The material of claim 1 wherein said one or more thermographic layers and said non-light sensitive adhesive layer are disposed on only one side of said polymeric support, and one or more non-light sensitive layers are disposed on the backside of said polymeric support, at least one of said backside layers comprises an antistatic agent.

14. The material of claim 13 wherein at least one of said non-light sensitive backside layers is a buried antistatic layer comprising metal oxide particles or electronically conductive polymer particles.

15. The material of claim 1 further comprising an outermost layer disposed over said one or more thermographic layers, said outermost layer comprising matte particles, a lubricant, thermomeltable particles, or any combination thereof.

16. A black-and-white direct thermographic material comprising an uncoated and untreated polyester support and having on only one side thereof:
 a thermographic layer comprising a non-photosensitive source of reducible silver ions that includes at least highly crystalline silver behenate and a reducing agent for producing a silver image, all distributed in a film-forming polyvinyl acetal or cellulosic polymer binder,
 an outermost layer disposed over said thermographic layer, said outermost layer comprising matte particles and a lubricant mixture distributed in a cellulosic polymer binder,
 disposed between said polymeric support and said thermographic layer, a non-light sensitive adhesive layer comprising a polyisocyanate-crosslinked hydrophobic polymer binder that is the reaction product of a polyisocyanate crosslinking agent with reactive sites of at least one of two or more hydrophobic polymer binders, that include a first polymer serving to promote adhesion of said adhesive layer to said polymeric support, and a second polymer, wherein said first and second polymers are different polymers,
 wherein said first polymer is a polyvinyl acetal, cellulosic polymer, polyester, polycarbonate, epoxy resin, rosin polymer, polyketone resin, vinyl polymer, or maleic anhydride ester copolymer, and
 said second polymer is a polyvinyl acetal, cellulosic polymer, vinyl polymer, or maleic anhydride-ester copolymer, and
 said polyisocyanate crosslinking agent comprising one or more of the following aromatic polyisocyanates in an amount of from about 10 to about 30% based on the total dry weight of said single-phase mixture:
 toluene (2,4 or 2,6)-diisocyanate and derivatives thereof, naphthalene 1,5-diisocyanate, 4,4'-diisocyanatodiphenylmethane, p-phenylene diisocyanate, triphenylmethane triisocyanate, tris-(4-isocyanatophenyl)thiophosphate, 3,3'-dimethyl-4,4'-biphenyl diisocyanate, and 3,3'-dimethoxy-4,4'-biphenyl diisocyanate.

17. A method of providing a visible image comprising contacting the thermographic material of claim 1 with a thermal imaging source.

18. The method of claim 17 wherein said thermal imaging source is a thermal print-head, and said thermographic material has a non-thermally sensitive outermost protective layer disposed over said one or more thermographic layers that has a dynamic coefficient of friction of less than 0.3 when said material is moved in contact with and relative to said thermal print-head.

19. A method of manufacturing a direct thermographic material comprising:
 A) applying to a polymeric support, a non-light sensitive adhesive layer formulation to form a non-light sensitive adhesive layer, said non-light sensitive adhesive layer formulation comprising a crosslinkable hydrophobic polymer binder and a polyisocyanate crosslinking agent that is reactive with reactive sites of said crosslinkable hydrophobic polymer binder, said polyisocyanate crosslinking agent being present in an amount of at least 10% based on total dry weight of said crosslinkable hydrophilic polymer binder, and
 B) subsequently or simultaneously, applying one or more thermographic layer formulations comprising a film-forming polymer binder over said non-light-sensitive adhesive layer.

20. The method of claim 19 wherein said non-light sensitive adhesive layer formulation further comprises a tertiary amine catalyst.

* * * * *